United States Patent
Debnath et al.

(10) Patent No.: US 12,543,620 B2
(45) Date of Patent: Feb. 10, 2026

(54) NAVIGATION SYSTEM FOR AGRICULTURAL MACHINE

(71) Applicant: Exel Industries, Epernay (FR)

(72) Inventors: Saptadeep Debnath, Plainfield, IN (US); Veera Rajendran, Carmel, IN (US)

(73) Assignee: Exel Industries, Epernay (FR)

( * ) Notice: Subject to any disclaimer, the term of this patent is extended or adjusted under 35 U.S.C. 154(b) by 143 days.

(21) Appl. No.: 18/506,867

(22) Filed: Nov. 10, 2023

(65) Prior Publication Data

US 2025/0151639 A1    May 15, 2025

(51) Int. Cl.
*A01B 69/04*     (2006.01)
*A01B 69/00*     (2006.01)

(52) U.S. Cl.
CPC .......... *A01B 69/008* (2013.01); *A01B 69/001* (2013.01)

(58) Field of Classification Search
CPC ..... A01B 69/001; A01B 69/008; A01B 69/04; A01M 7/0089
USPC ......................................................... 701/50
See application file for complete search history.

(56) References Cited

U.S. PATENT DOCUMENTS

| | | | |
|---|---|---|---|
| 5,911,669 A | 6/1999 | Stentz et al. | |
| 8,433,483 B2 | 4/2013 | Han et al. | |
| 10,721,859 B2 | 7/2020 | Wu et al. | |
| 10,750,655 B2 | 8/2020 | Henry | |
| 11,635,765 B2 * | 4/2023 | Vandike | B60K 35/22 701/50 |
| 11,778,934 B2 * | 10/2023 | Ellaboudy | B60W 40/114 701/50 |
| 11,832,609 B2 * | 12/2023 | Humpal | A01M 7/0042 |
| 2019/0150357 A1 * | 5/2019 | Wu | H04N 7/188 |
| 2020/0334859 A1 * | 10/2020 | Sneyders | G06T 7/80 |

(Continued)

FOREIGN PATENT DOCUMENTS

| | | | |
|---|---|---|---|
| BR | 102022024455 A2 * | 8/2023 | |
| BR | 102022024438 A2 * | 9/2023 | |

(Continued)

OTHER PUBLICATIONS

Kobayashi, T., Inagaki, M., Hata, S., & Takai, M. (Jul. 1992). Crop-row detecting system by neural network. In International Symposium on Transplant Production Systems 319 (pp. 647-652).

(Continued)

*Primary Examiner* — Atul Trivedi
(74) *Attorney, Agent, or Firm* — Maginot, Moore & Beck LLP (57) ABSTRACT

An agricultural machine includes a vehicle, an image detector, memory, a processing circuit, and a steering control unit. The vehicle has at least one agricultural implement affixed thereto. The image detector is mounted to the vehicle and is configured to generate first image data. The memory stores at least a first trained model of a crop row detection neural network. The processing circuit is configured to generate a crop row prediction image using the first image data, the first trained model, and a convolutional neural network. The processing circuit is further configured to generate navigational parameters based at least in part on the crop row prediction. The steering control unit is configured to control movement of vehicle based on the navigational parameters.

17 Claims, 5 Drawing Sheets

(56) References Cited

U.S. PATENT DOCUMENTS

| | | | |
|---|---|---|---|
| 2021/0153500 A1* | 5/2021 | Kuenzi | G06V 10/56 |
| 2021/0185885 A1* | 6/2021 | Sibley | A01B 69/001 |
| 2021/0186006 A1* | 6/2021 | Sibley | A01M 99/00 |
| 2021/0192294 A1 | 6/2021 | Stanhope et al. | |
| 2021/0192754 A1* | 6/2021 | Sibley | G06N 20/00 |
| 2022/0132829 A1* | 5/2022 | Kwak | A01C 23/047 239/11 |
| 2022/0183208 A1* | 6/2022 | Sibley | A01B 69/001 |
| 2022/0350991 A1 | 11/2022 | Vesperman et al. | |
| 2022/0377962 A1* | 12/2022 | Susko | G05D 1/0246 |
| 2022/0386527 A1* | 12/2022 | Schleicher | G05D 1/0278 |
| 2023/0011137 A1* | 1/2023 | Hebb | G05D 1/0219 |
| 2023/0039092 A1* | 2/2023 | Anderson | A01M 7/0089 |
| 2023/0040430 A1* | 2/2023 | Redden | G06V 20/13 |
| 2023/0094371 A1* | 3/2023 | Varma Bhupatiraju | B60W 40/10 701/1 |
| 2023/0112003 A1* | 4/2023 | Krog | B60L 1/003 172/1 |
| 2023/0114803 A1* | 4/2023 | Flick | A01B 69/001 701/50 |
| 2023/0115920 A1* | 4/2023 | Flick | A01B 63/32 701/50 |
| 2023/0122084 A1* | 4/2023 | Sibley | A01B 79/005 47/1.7 |
| 2023/0126714 A1* | 4/2023 | Sibley | A01M 7/0089 239/74 |
| 2023/0166283 A1* | 6/2023 | Sibley | B05B 15/68 239/587.5 |
| 2023/0172108 A1* | 6/2023 | Long | A01D 41/127 56/10.2 R |
| 2023/0189710 A1* | 6/2023 | Anderson | A01D 43/085 56/10.2 A |
| 2023/0189711 A1* | 6/2023 | Mcdonald | G06T 7/73 56/10.2 A |
| 2023/0234559 A1* | 7/2023 | Potter | B60W 30/188 |
| 2023/0309450 A1* | 10/2023 | Wigdahl | A01D 46/085 701/50 |
| 2024/0004397 A1* | 1/2024 | Rupp | G05D 1/0223 |
| 2024/0036579 A1* | 2/2024 | Rands | A01B 69/008 |
| 2024/0049616 A1* | 2/2024 | Torzewski | G05D 1/648 |
| 2024/0114887 A1* | 4/2024 | Garner | A01M 7/0089 |
| 2024/0130350 A1* | 4/2024 | Leger | G06V 10/70 |
| 2024/0176010 A1* | 5/2024 | Fedor | G01S 13/867 |
| 2024/0177494 A1* | 5/2024 | Bhupatiraju | G06T 7/20 |
| 2024/0180057 A1* | 6/2024 | Bhupatiraju | B62D 15/025 |
| 2024/0206454 A1* | 6/2024 | Kanagaraj | G06V 20/188 |
| 2024/0253074 A1* | 8/2024 | Rees | G05B 13/0265 |
| 2024/0268277 A1* | 8/2024 | Cochrane | A01B 69/001 |
| 2024/0292826 A1* | 9/2024 | Kwak | A01M 7/0042 |
| 2024/0381803 A1* | 11/2024 | Wagner | G05D 1/2245 |
| 2024/0397928 A1* | 12/2024 | Sandbrook | G01S 17/894 |
| 2024/0404108 A1* | 12/2024 | Schoff | G06T 7/80 |
| 2024/0428583 A1* | 12/2024 | Arakawa | G06V 10/764 |
| 2025/0194578 A1* | 6/2025 | Chen | A01B 79/005 |
| 2025/0245985 A1* | 7/2025 | Calderon | G06T 7/13 |

FOREIGN PATENT DOCUMENTS

| | | | | |
|---|---|---|---|---|
| CA | 3213306 A1 * | 4/2024 | | A01B 79/005 |
| EP | 1836648 B1 | 4/2016 | | |
| EP | 1738630 B1 | 11/2018 | | |
| EP | 4159016 A1 * | 4/2023 | | G05D 1/646 |
| EP | 4218379 A1 * | 8/2023 | | G05D 1/65 |
| EP | 4223119 A1 * | 8/2023 | | A01M 7/0014 |
| EP | 4226751 A1 * | 8/2023 | | A01B 79/005 |
| JP | 01211410 A | 8/1989 | | |
| JP | 04336383 A | 11/1992 | | |
| JP | 07306717 A | 11/1995 | | |
| WO | 2015171946 A1 | 11/2015 | | |
| WO | 2020014519 A1 | 1/2020 | | |
| WO | 2020036942 A1 | 2/2020 | | |
| WO | WO-2023112515 A1 * | 6/2023 | | G01C 21/3867 |
| WO | 2023127437 A1 | 7/2023 | | |
| WO | WO-2023150023 A1 * | 8/2023 | | G06V 10/774 |
| WO | WO-2023230730 A1 * | 12/2023 | | A01M 7/0089 |
| WO | WO-2024236368 A1 * | 11/2024 | | A01M 7/0085 |

OTHER PUBLICATIONS

International Search Report and Written Opinion corresponding to International Patent Application No. PCT/IB2024/000782, dated May 26, 2025. (13 pages).

* cited by examiner

NAVIGATION SYSTEM FOR AGRICULTURAL MACHINE

TECHNICAL FIELD

Embodiments described herein generally relate to vision-based computer-assisted driving systems for agricultural equipment.

BACKGROUND

Agricultural crops, for example, corn and soybeans, are typically planted in equally spaced parallel rows in a field. Farming often involves passing agricultural equipment such as tractors, planters, harvesters, irrigators, crop sprayers and the like in between the rows. Such agricultural equipment typically includes a vehicle, and working devices or systems that perform an operation on the crops. The vehicle, and sometimes the working devices, include wheels, treads, skids, or other support structures that contact the ground. During use of the agricultural equipment, such support structures ideally remain in between the crop rows so as not to damage the crops.

Traditionally, agricultural machines are driven by a human operator, who can use manual or assisted steering systems to ensure that the vehicle wheels or other support structures remain between the rows to minimize damage to crops. However, such operation requires substantial concentration and physical control over an extended period of time that can lead to fatigue in the human operator. Accordingly, systems have been developed in which the steering is automated to some degree using, for example, GPS (global position system) based navigation systems.

Navigation systems using global position system (GPS) units are used to locate the position of the vehicle with respect to crop rows, when they are planted with the assistance of GPS. Generally, these systems use an initialization operation to determine positions through which the agricultural equipment should travel and then provide information about the current position of vehicle in a field to facilitate navigation. An example initialization operation can include using a GPS unit to record the position/movement of agricultural equipment as the row crops are planted. This recording can later be used to guide other agricultural equipment for subsequent operations. The GPS navigation data can be fine-tuned using a "base station" with known GPS coordinates. The difference between the measured GPS coordinates of the "base station" during operation is compared to the computed coordinates from the GPS to determine the current GPS error, which may then be used to correct the navigation data.

In addition, or in the alternative, image-based control can be used to guide agricultural equipment vehicles through the crop rows. Image-based control can be superior to external location mechanisms, such as, for example, GPS, due to errors associated with the satellite signals on which GPS system is based. The external location computing mechanism can have other inaccuracies including if the machine is on a slope or if machine had difficulty following the path prescribed by GPS due to mechanical deficiencies. Image based control systems generally involve a sensor, such as a camera, mounted on the agricultural equipment to obtain images of the environment. These images can be used to ascertain position relative to a crop related row (e.g., a crop row or the space between the crop rows) positions and provide that information as parameters to a steering controller to control the vehicle.

Prior art systems have used image filtering and other methods to distinguish crop from soil between the crop rows and determine the location of the crop rows relative to the vehicles, and use such information to steer the machine between rows.

There remains a need, however, for a more robust method of controlling the navigation of an agricultural machine through crop rows.

SUMMARY

At least some embodiments described here provide improved control of agricultural machines by using convolutional neural networks in a vision based navigation system.

A first embodiment is an agricultural machine having a vehicle, an image detector, memory, a processing circuit, and a steering control unit. The vehicle has at least one agricultural implement affixed thereto. The image detector is mounted to the vehicle and is configured to generate first image data. The memory stores at least a first trained model of a crop row detection neural network. The processing circuit is configured to generate a crop row prediction image using the first image data, the first trained model, and a convolutional neural network. The processing circuit is further configured to generate navigational parameters based at least in part on the crop row prediction. The steering control unit is configured to control movement of vehicle based on the navigational parameters.

A second embodiment is a method for use in an agricultural machine that includes using an image detector mounted to the agricultural machine to generate first image data. The method also includes using a processing circuit configured to generate a crop row prediction image using the first image data, a first trained model stored in a memory, and a convolutional neural network, and using the processing circuit to generate navigational parameters based at least in part on the crop row prediction. The method further includes automatically adjust a heading and/or path of the vehicle based on the navigational parameters.

The above-described features and advantages, as well as others, will become more readily apparent to those of ordinary skill in the art by reference to the following detailed description and accompanying drawings.

DETAILED DESCRIPTION

Figure 1:
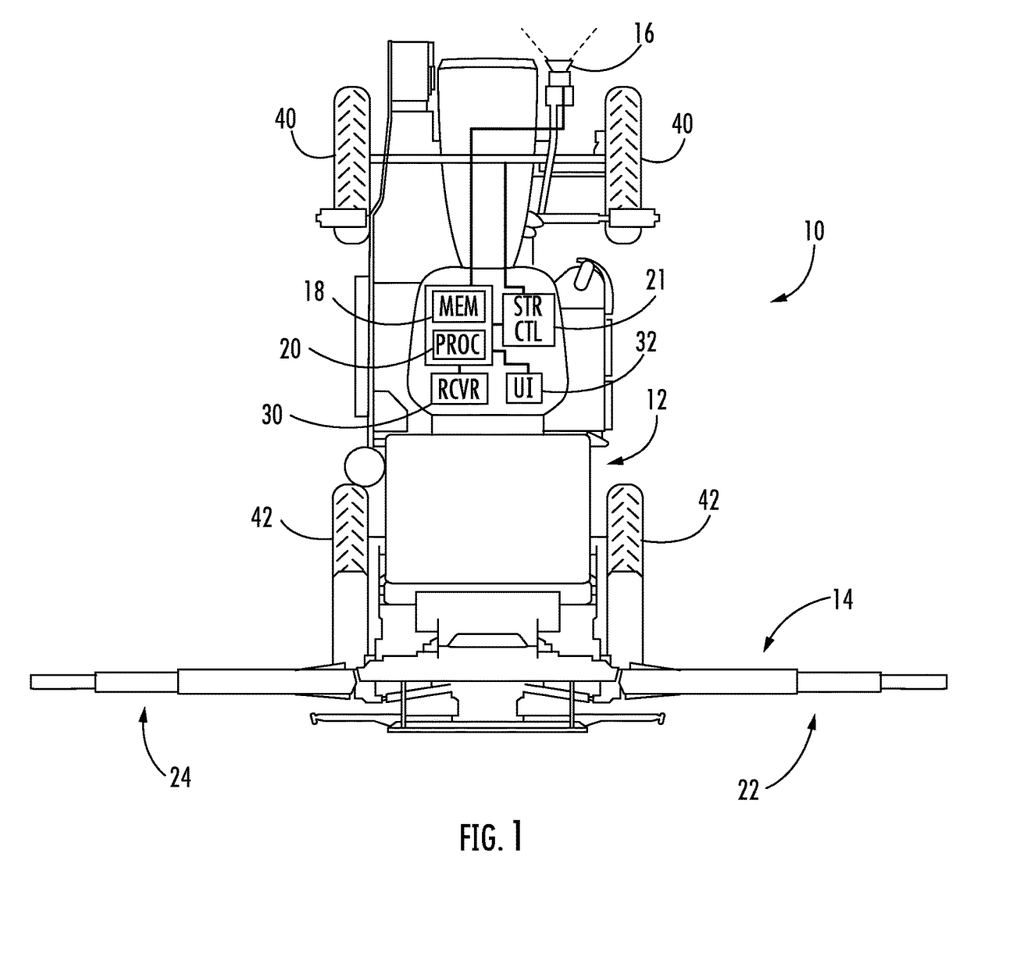
FIG. 1 shows a schematic diagram of an agricultural machine according an exemplary embodiment.

FIG. 1 shows a schematic diagram of an agricultural machine 10 according an exemplary embodiment. The agricultural machine 10 includes, among other things, a vehicle 12, at least one agricultural implement 14. The agricultural implement 14 in this embodiment is a spray boom mounted on the vehicle 12, but may another implement, and need not be mounted on the vehicle but rather trailed behind. The agricultural machine 10 in this embodiment further includes an image detector 16, a memory 18, a processing circuit 20, and a steering control unit 21. In this embodiment, the agricultural machine 10 further includes a receiver system 30 configured to receive navigational coordinates or data from an external source, and a user interface 32. The receiver system 30 may suitably be a GPS receiver system, as is known in the art.

The vehicle 12 includes, in addition to means of propulsion such as electric motor or internal combustion engine, at least one set of steerable wheels 40 and one or more other sets of wheels 42. Some agricultural machines use other transport support structures, such as tracks or skids, in lieu of one more of the sets of wheels 40, 42.

The agricultural implement 14 is mounted to the vehicle 12, and comprises structures and/or systems that perform an operation on crops, such as harvesting, planting or fertilizing. In this exemplary embodiment, the agricultural machine 10 is a crop sprayer, and the agricultural implement includes booms 22, 24 having spray-heads and pipes or hoses, not shown, configured to deliver fertilizer, herbicide, pesticide, fungicide or other agents to crops. In some case the agricultural implement includes transport support structures such as wheels, skids or tracks, not shown, but which are known in the art. It will be appreciated that the transport support structures of the vehicle 12 and the agricultural implement 14 (if any) are disposed at relative spaces that correspond to the spaces between several adjacent rows of the crop. As a consequence, if one of the wheels 40, 42 is disposed in a furrow or space (between crops), the all of the other wheels or other transport support structures are also in furrows or space (or otherwise not disposed on the crop row).

The image detector 16 is a device that is mounted to the vehicle 12, and is configured to generate first image data regarding a field of vision 26 in front of the vehicle 12. In this embodiment, the image detector 16 is a depth camera configured to generate image data in the form RGB data values and depth data values for a plurality pixels that collectively form an image.

The memory 18 stores, among other things, at least a first trained model of a crop row detection neural network. In this embodiment, the memory 18 stores multiple trained models of a crop row detection neural network, each corresponding to a different crop type. For example, the first trained model corresponds to corn crops, while a second trained model corresponds to soybean crops. As will be discussed below in detail, the crop row detection neural network is configured to be used to determine whether each pixel of the input image data is part of a crop row, or is not a part of a crop row. The memory 18 is preferably also mounted on or to the vehicle, and may be part of a larger electronic system, not shown, used to control various aspects of the vehicle.

In this embodiment, the memory 18 further geographical crop row information comprising geographical coordinates or like data pertaining one or more sets of crop rows that may be stored, for example, during planting.

The processing circuit 20 is configured to generate a crop row prediction image using the first image data, the first trained model, and a convolutional neural network, the processing circuit 20 further configured to general navigational parameters based at least in part on the crop row prediction. In this embodiment the processing circuit 20 is further configured to generate the navigational parameters based at least in part on navigational data received from the receiver system 30 and/or the geographical crop row information stored in the memory 18.

As will be discussed below, the processing circuit 20 determines a preliminary heading and cross track error based on the geographical location of the vehicle (e.g. GPS coordinates received from the receiver system 30), and the stored geographical crop row information. The processing circuit 20 refines the heading and cross-track error based on the first image data, the first trained model and the convolutional neural network. The processing circuit 20 provides navigational parameters corresponding to the refined heading and cross-track error to the steering control unit 21.

The steering control unit 21 is a circuit known in the art that is configured to control a heading and cross-track error of the vehicle based on navigational parameters received from the processing circuit 20. Such steering control units are known in the art, particularly those used with agricultural equipment.

The user interface 32 is device or set of devices mounted on the vehicle 10 capable of receiving input from a human operator and conveying corresponding input signals to the processing circuit 20, and providing output to a human operator based on corresponding output signals received from the processing circuit 20. The user interface 32 may suitably take the form of a touch-screen interface, but other formats may be used. In an alternative embodiment, the user interface 32 is located external to the agricultural machine, and is further configured to communicate with the processing circuit 20 via wireless signals. For example, the user interface 32 may suitably be a wireless smartphone or other portable computer having an application for carrying out the operations attributed to the user interface 32 as described herein.

Figure 2:
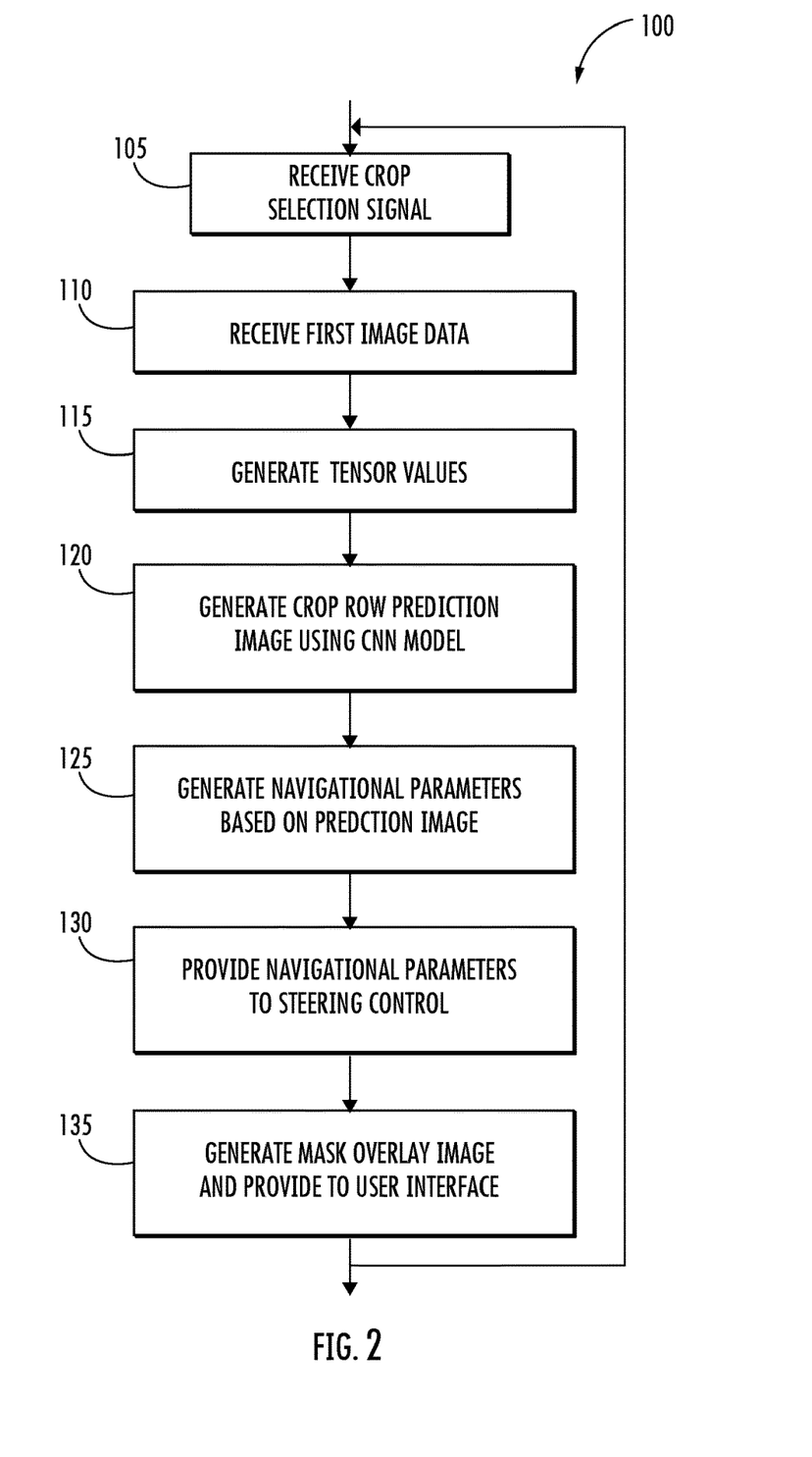
FIG. 2 shows a flow diagram that shows an exemplary set of operations of a processing circuit of the agricultural machine of FIG. 1.

The operation of the agricultural machine 10 is further described in connection with FIGS. 1 and 2. FIG. 2 shows a flow diagram 100 that shows an exemplary set of operations of the processing circuit 20 during the operation of the agricultural machine 10. The agricultural machine 10 is initially placed at a beginning position, e.g., an end of a set of crop rows. The receiver 30 provides geographical coordinate information which can be used by the processing circuit 20 to generate an initial heading of the agricultural machine, with or without assistance of manual steering by an operator. The provision of an initial heading based on GPS coordinates and predefined information regarding the crop rows is known in the art. However, the use of GPS coordinates and predefined information alone is typically not accurate enough to avoid crop damage. For example, the GPS coordinates may not have been stored during planting by an operator, or may contain position errors. Furthermore, there can be changes in terrain between the time of the GPS data collection and the time of operation or corruption of stored data.

Accordingly, the processing circuit 20 performs the steps in FIG. 2 to provide real-time correction to the steering of the agricultural machine 10 to ensure that the wheels 40, 42 or other supports remain in the furrows or, in other words, space between the rows. The real-time correction adapts for the errors associated with predefined coordinate collection.

In step 105, the processing circuit 20 receives a crop selection signal which identifies or corresponds to the type of crop (corn, soybeans, etc.) in or proximate to which the agricultural machine is currently placed. In this embodiment, the processing circuit 20 receives the crop selection signal as an input (or stored data) corresponding to the type of crop being processed. Each type of crop preferably corresponds to a different convolutional neural network model stored in the memory. Thus, a first crop selection signal corresponds to a first neural network model, a second crop selection signal corresponds to a second neural network model, and so forth.

The crop selection signal may be obtained from input of an operator, for example, through the user interface 32. Alternatively, the processing circuit 20 may execute an additional program or routine stored in memory 18 to detect the type of crop automatically based on signals from the image detector 16. In such a case, the crop selection signal is the output of the routine that identifies the type of crop. In yet other embodiments, the processing circuit 20 may contain stored information that relates the GPS coordinates of the vehicle 10 (received via the receiver) to the type of crop planted. The processing circuit 20 in such a case obtains the crop selection signal as a stored crop identification value corresponding to the current GPS coordinates.

Figure 3:
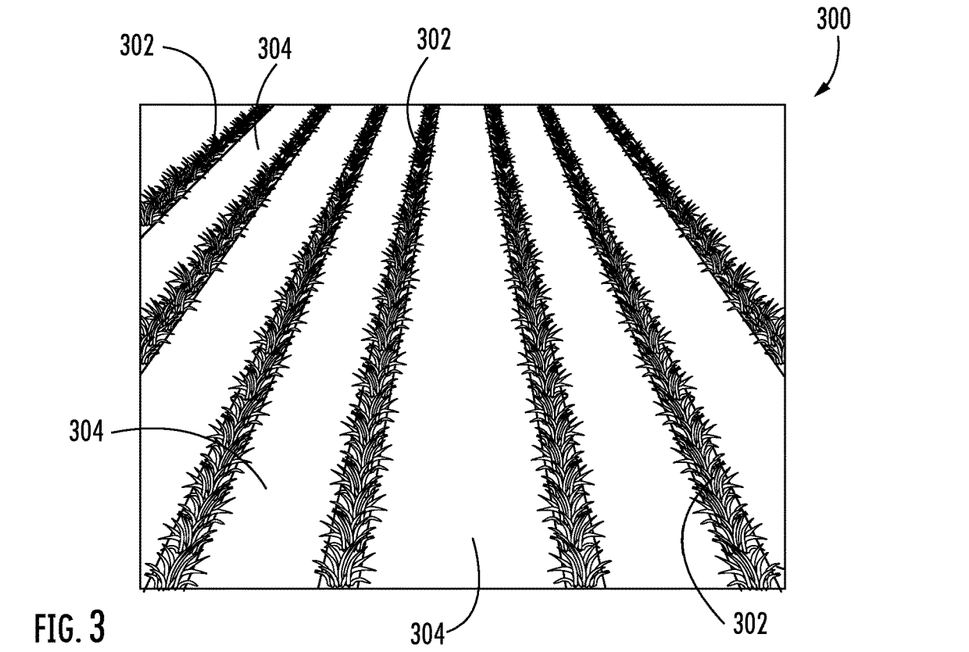
FIG. 3 shows an exemplary image capture of first image data regarding an exemplary field being traversed.

In step 110, the processing circuit 20 receives first image data received from the image detector 16, and geographical coordinates of the vehicle 12 from the receiver 30. FIG. 3 shows an exemplary image capture of first image data 300, which includes RGB color data as well as intensity data. As shown in FIG. 3, the image shows a series of crop rows 302 have furrows 304 in between. Referring again to FIG. 1, the image data 300 comprises an image of the field of vision 26 of the image detector 16. In general, the goals of the navigational method described herein is to control the vehicle 12 (or provide assistance to a driver to control the vehicle 12) to keep the wheels and/or other supports of the vehicle in the furrows 304 between the crop rows 302. In this embodiment, the image detector 16 may provide the first image data as Robot Operating System message, commonly referred to as ROS messages.

In step 115, the processing circuit 20 performs a set of pre-processing operations to generate image tensor values. In this embodiment, the processing circuit 20 in this embodiment converts the ROS messages to a format suitable for use in the Python numerical calculation library. For example, the processing circuit 20 may use a so-called numpify routine to convert the first image data into NumPy arrays, usable by the Python library for working with arrays. Once converted, the processing circuit 20 performs a frame-to-transformation operation (using Python library operations) on the converted first image data to generate first image tensor data. The tensor data format allows the prediction network, discussed further below, to predict the crop rows. During that process, the first image data can be downsized and cropped. In addition, the data may be normalized using augmentations by the same factor that had been applied during the training of the neural network model.

In step 120, the processing circuit 20 generates a crop row prediction image based on the pre-processed first image data (e.g. first image tensor data), and the neural network model stored in memory that corresponds to the crop selection signal received or retrieved in step 105. The crop row prediction image comprises a plurality of pixels corresponding to the first image data, each of the plurality of pixels having an image value selected from a set of reference image values, wherein the set of reference image values includes at least a first reference image value representative of predicted crop row position, and at least a second reference image value representative of a predicted non-crop row position.

Figure 4:
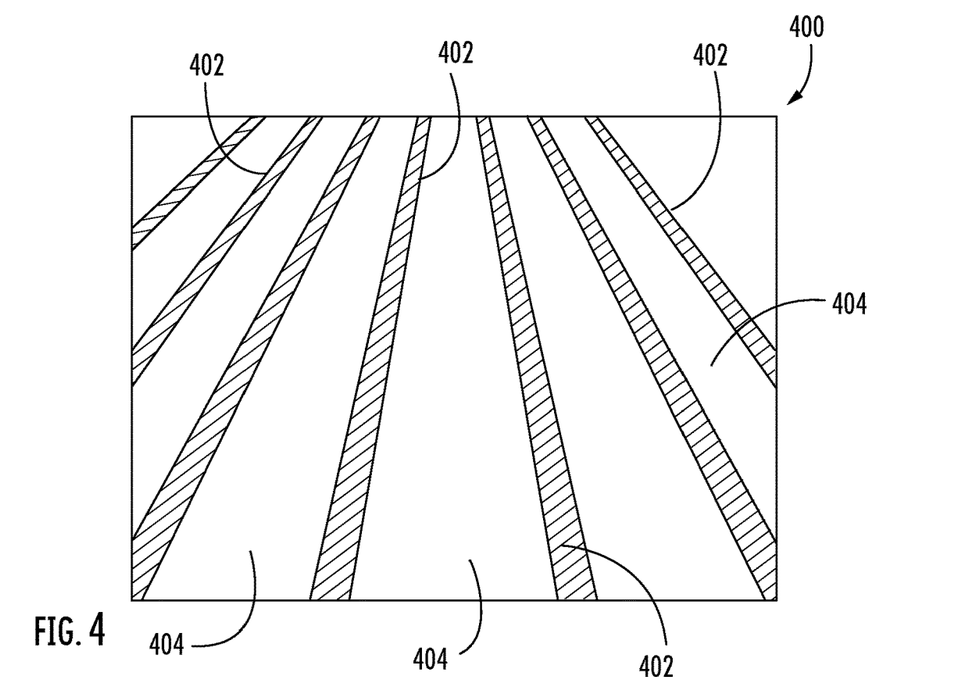
FIG. 4 shows an exemplary crop row prediction image generated by the processing circuit of the agricultural machine of FIG. 1.

In this embodiment, the crop row prediction image is a two-dimensional binary mask array. For example, the mask array is a series of bits representative of pixels. Each pixel bit has one of two values: a first value if the pixel is predicted to be a crop row, or a second value if the pixel is predicted not to be a crop row. FIG. 4 shows an exemplary crop row prediction image 400 having groups 402 of pixels having the first value (crop row), and groups 404 of pixels having the second value (not crop row).

In step 125, the processing circuit 20 generates navigational parameters, for example, heading and cross track corrections, based on the crop row prediction image and provides the parameters to the steering control 21. The navigational parameters provide information that, when received by the steering control, will cause the steering control 21 to cause the wheels 40 to be oriented such that the wheels 40, 42 and/or other supports of the machine 10 remain in the furrows between the crop rows.

Figure 5:
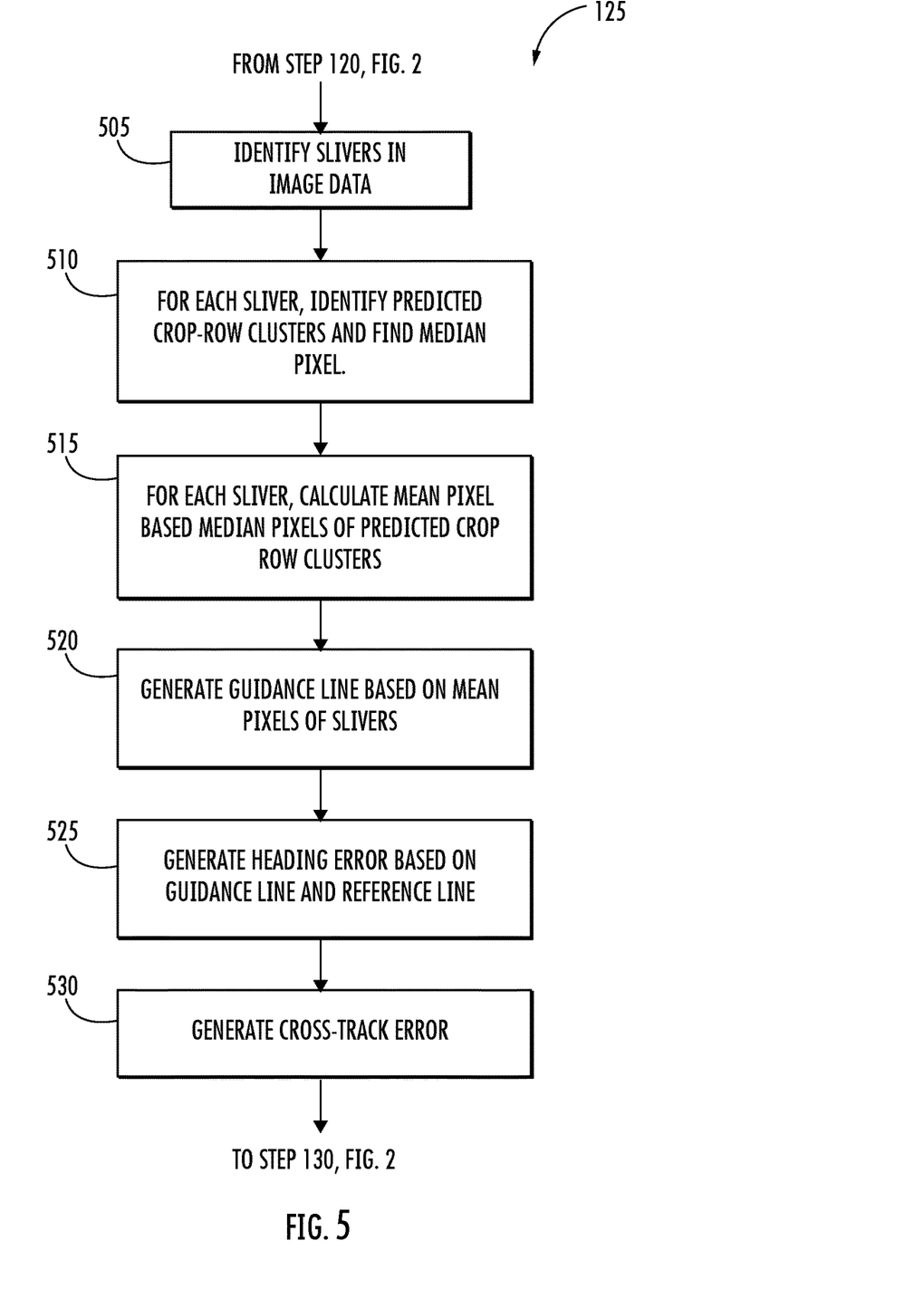
FIG. 5 shows additional exemplary operations of the processing circuit.
Figure 6:
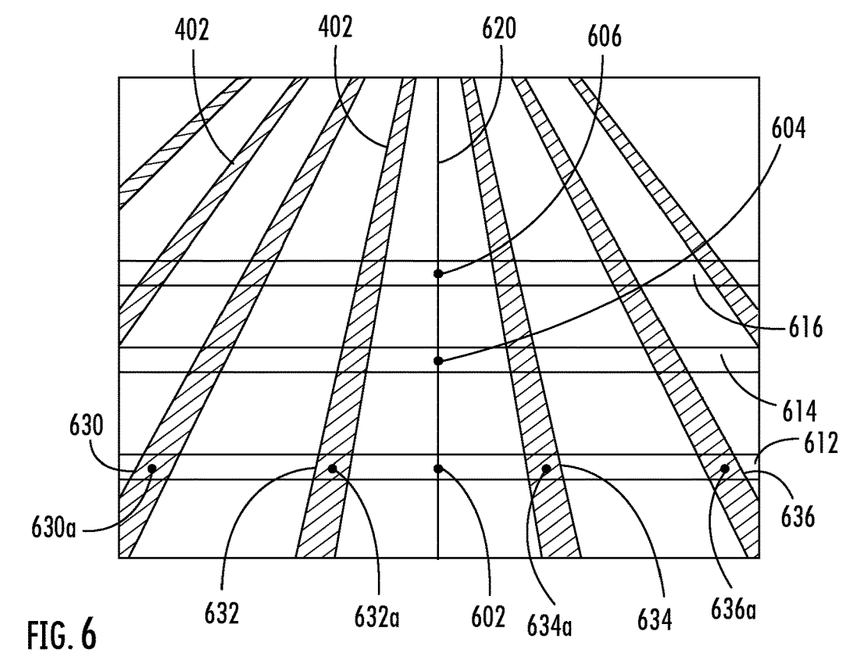
FIG. 6 shows a representation of the crop row prediction image of FIG. 4 with the mean data points for each of a plurality of horizontal slices as determined by the processing circuit.

Further detail regarding step 125 is given in connection with FIGS. 5 and 6. FIG. 5 shows a flow diagram of an exemplary set of operations performed by the processing circuit 20 to carry out step 125.

In step 505, the processing circuit 20 identifies multiple horizontal slivers in the image data. FIG. 6 shows a representation of the crop row prediction image 400 with a plurality of horizontal slices or slivers 612, 614, 616 of predicted crop row portions. In step 510, the processing circuit 20 identifies in each sliver predicted crop-row clusters, and determines the median pixel in each of the predicted crop row clusters. The median pixel in each cluster is the pixel with as many predicted crop row pixels on its "left" as predicted crop row pixel on its "right". As shown in FIG. 6, the sliver 612 of the image 400 include four predicted clusters 630, 632, 634 and 636, each with a median pixel 630a, 632a, 634a and 636a.

Thereafter, in step 515, the processing circuit 20 then calculates a mean data point for each of a plurality of horizontal slivers or slices of the predicted crop rows. To this end, the processing circuit 20 calculates the mean data point using the mean value of the median pixels of the predicted clusters (determined in step 510) in each sliver. In FIG. 6, the mean data point 602 of the horizontal slice 612 is the mean of pixels 630a, 630b, 630c and 630d. FIG. 6 also shows the mean data points 604, 606 for each of the plurality of horizontal slices 614, 616 of predicted crop row portions.

In step 520, the processing circuit 20 then generates a guidance line based on the mean pixels or data points. The guidance line represents the path that the agricultural machine 10 should follow to keep the ground supports/wheels between the crop rows. For example, the processing circuit 20 in one embodiment uses a regression method to fit a line among the mean data points such as points 602, 604 and 606 of FIG. 6. The resulting fitted line is the guidance line 620, as shown in FIG. 6, which is in the image plane coordinate system. The image plane coordinate system is the coordinate system as shown in FIG. 6.

In step 525, the processing circuit 20 determines the heading error based on a machine reference line, which is the path that the machine is currently on, and the guidance line 620 generated in step 520. The heading error is a value representative of the angle between the reference line and the guidance line.

It will be appreciated that the reference line may suitably be determined by the processing circuit 20 in an ongoing manner, and is representative of the actual path of the machine. In this embodiment, wherein the image detector 16 is a depth camera, the processing circuit 20 uses depth information from the image 400 to identify the number of pixels that have the same (properly scaled) lateral distance from the center of the image 400 as the physical lateral distance from the image detector 16 and the center of the hood of the machine 10. For example, if the distance from the image detector 16 to the center of the front of the machine 10 is one meter, then the processing circuit 20 identifies in the image 400, using the depth information, a set of pixels that correspond to being one meter distance from the center line of the image 400. These points represent parts of the reference line. Information representative of the physical lateral distance between the center of the hood of the machine 10 and the image detector 16 may be measured and stored in the memory 18 upon installation of the image detector 16. The processing circuit 20 then computes a best-fit line from the set of pixels to provide the machine reference line, which is also in the image plane coordinate system.

Referring again to FIG. 5, in step 530, the processing circuit 20 determines the cross-track error based on the lateral distance between one or more pixels on the guidance line and one or more corresponding pixels on the machine reference line at one or more predetermined distances. The processing circuit 20 uses the predetermined distance and the image plane coordinates for each set of corresponding pixels to determine the real-world coordinates (x, y, z) of the corresponding pixels. The processing circuit 20 then determines the lateral distance between the corresponding pixels (using the x coordinates) to determine the cross-track error. In this embodiment, the predetermined distance is less than 10 meters, and preferably 5 meters, from a front portion of the agricultural machine 10.

Referring again to FIG. 2, in step 130, the processing circuit 20 provides the navigational parameters, which in this embodiment are the heading error and cross-track error, to the steering control system 21. The steering control system 21 then processes the navigational information to control the orientation of the wheels 40 to control the direction of the agricultural machine 10.

It will be appreciated that for majority of the operation of the algorithm of FIG. 5, the machine 10 would be in a straight set of crop rows. In this embodiment, the operator is expected to make a manual turn at the end of the rows, and at least roughly align the machine 10 again with the straight rows. The algorithm is however tolerant enough if the operator does not align the machine in an exact matter. In case the machine has pre-recorded GPS data of the crop rows, it is also possible that at the end of a straight row the GPS input kicks in and the machine prioritizes the GPS input for steering control over the image based navigation parameters. The processing circuit 20 is configured to be robust enough to handle curves in the majority straight rows as the cross track error is an instance-based calculation (as in it is only calculated for a single pixel in an image) and the heading error computed from the generated guidance line generalizes the position of the predicted crop rows.

Figure 7:
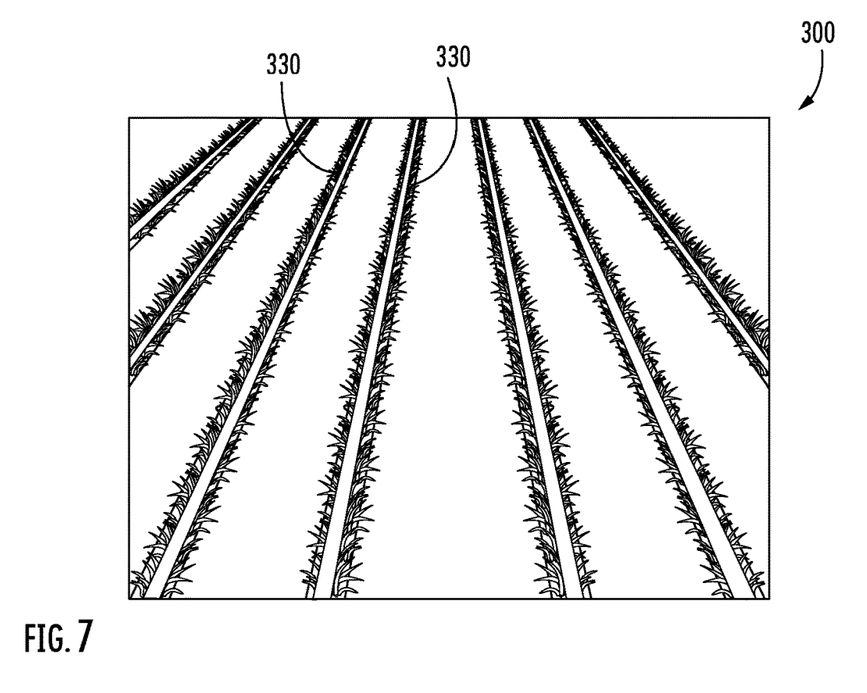
FIG. 7 shows on overlay image illustrating the crop row prediction image of FIG. 4 overlaid on the image capture of FIG. 3.

The method described herein further provides visual feedback of the predicted crop row image to the operator. In step 135, the processing circuit 20 generates overlay image data which represents the first image data with the crop row prediction image overlaid thereon. To this end, the processing circuit 20 first downsizes the image of the first image data by the same factor as the mask had been downsized in step 115. Thus, the downsized first image data has the same image dimension as the crop row prediction image. The processing circuit 20 then, for each pixel of the crop row prediction image indicating predicted crop row (the first value), the corresponding pixel of the first image data is adjusted to be all one color, for example, red. FIG. 7 shows a representative diagram of the first image data 300 with the binary mask 330 overlaid. The processing circuit 20 does not adjust any pixels of the first image data where the corresponding image data in the crop row prediction image indicates prediction not in crop row (the second value).

Such information can allow the operator of the machine 10 some feedback as to the operation of the navigational method.

The steps of the flow diagram 100 are repeated in an ongoing manner to provide real-time control of the steering of the vehicle.

Training

Prior to use, the neural network models are put through a training process. In this embodiment, each of a plurality of models is trained for a plurality of crops. Specifically, a first trained neural network model corresponds to corn crops, and a second trained neural network corresponds to soybean crops. In general, for each type of crop, a data collection step is performed in which images of crop rows are obtained. The images can then be processed by manually marking on the image, the areas where crops exist. This process is known as annotation or labeling. The collected data can then be provided to the neural network, and traditional techniques may be used to develop a set of weights for the convolutional neural network model based on the manually identified crop rows and the image data.

It will be appreciated that the above-described embodiments are merely exemplary, and that those of ordinary skill in the art may readily devise their own modifications and implementations that incorporate the principles of the present invention and fall within the spirit and scope thereof.

The invention claimed is:

1. An agricultural machine, comprising:
   a vehicle having at least one agricultural implement operably connected thereto;
   an image detector mounted to the vehicle and configured to generate first image data;
   a memory storing at least a first trained model of a crop row detection neural network;
   a processing circuit configured to generate a crop row prediction image using the first image data, the first trained model, and a convolutional neural network, the processing circuit further configured to generate navigational parameters based at least in part on the crop row prediction;
   a steering control unit configured to control a heading of the vehicle based on the navigational parameters.

2. The agricultural machine of claim 1, wherein the at least one agricultural implement comprises a crop sprayer.

3. The agricultural machine of claim 1, wherein the crop row prediction image comprises a plurality of pixels, each of the plurality of pixels having an image value selected from a set of reference image values, wherein the set of reference image values includes a first reference image value representative of predicted crop row position, and a second reference image value representative of a predicted non-crop row position.

4. The agricultural machine of claim 1, wherein:
   the memory further stores at least a second trained model of a crop row detection neural network;
   the first trained model corresponds to a first crop type; and the second trained model corresponds to a second crop type.

5. The agricultural machine of claim 4, wherein:
the processing circuit is configured to generate the crop row prediction image based on the first image data, the first trained model, and the convolutional neural network responsive to receiving a first crop selection signal from a user interface; and
the processing circuit is configured to generate the crop row prediction image based on the first image data, the second trained model, and the convolutional neural network responsive to receiving the second crop selection signal from the user interface.

6. The agricultural machine of claim 5, wherein the agricultural machine further comprises the user interface.

7. The agricultural machine of claim 1, wherein the processing circuit is further configured to generate overlay image data based on the crop row prediction image and the first image data, and provide the overlay image data to a user interface display.

8. The agricultural machine of claim 7, wherein the agricultural machine further comprises the user interface display.

9. The agricultural machine of claim 7, wherein the processing circuit is further configured to generate the crop row prediction image by downsizing and normalizing the first image data using a downsizing factor, and performing a neural network operation on the downsized and normalized first image data.

10. The agricultural machine of claim 9, wherein the processing circuit is further configured to generate the overlay image data by:
downsizing the first image data by a factor corresponding to the downsizing factor;
overlaying the crop row prediction image on the downsized first image data.

11. A method for use in an agricultural machine, comprising:
using an image detector mounted to the agricultural machine to generate first image data;
using a processing circuit configured to generate a crop row prediction image using the first image data, a first trained model stored in a memory, and a convolutional neural network;
using the processing circuit to generate navigational parameters based at least in part on the crop row prediction; and
automatically adjust a heading and/or path of the vehicle based on the navigational parameters.

12. The method of claim 11, further comprising using the agricultural machine to spray crops.

13. The method of claim 11, wherein the crop row prediction image comprises a plurality of pixels, each of the plurality of pixels having an image value selected from a set of reference image values, wherein the set of reference image values includes a first reference image value representative of predicted crop row position, and a second reference image value representative of a predicted non-crop row position.

14. The method of claim 11, further comprising:
using the processing circuit is configured to generate the crop row prediction image based on the first image data, the second trained model, and the convolutional neural network responsive to receiving a crop selection signal from the user interface.

15. The method of claim 14, wherein the agricultural machine further comprises the user interface.

16. The method of claim 11, wherein the navigational parameters include heading information and cross-track error information.

17. The method of claim 16, wherein using the processing circuit to generate navigational parameters based at least in part on the crop row prediction further comprises:
identifying a machine reference line representative of a current heading of the agricultural machine;
identifying a guidance line based on the crop row prediction image;
determining the cross-track error information based on the guidance line and the machine reference line.

* * * * *